United States Patent [19]
De Bot

[11] Patent Number: 5,917,810
[45] Date of Patent: Jun. 29, 1999

[54] TWO-WAY MULTIPLE ACCESS COMMUNICATION SYSTEM, AND A CENTRAL STATION AND A USER STATION FOR USE IN SUCH A SYSTEM

[75] Inventor: Paulus G. M. De Bot, Eindhoven, Netherlands

[73] Assignee: U.S. Philips Corporation, New York, N.Y.

[21] Appl. No.: 08/767,460

[22] Filed: Dec. 16, 1996

Related U.S. Application Data

[63] Continuation of application No. 08/485,893, Jun. 7, 1995, abandoned.

[30] Foreign Application Priority Data

Sep. 6, 1994 [EP] European Pat. Off. .............. 94201652

[51] Int. Cl.[6] ...................................................... H04J 3/00
[52] U.S. Cl. ............................................ 370/294; 370/524
[58] Field of Search .................................. 370/294, 296, 370/295, 321, 329, 337, 336, 341, 344, 347, 348, 430, 442, 461, 462, 480, 478, 485, 486, 493, 496, 498, 524, 522, 535; 348/6, 10, 12, 13, 14, 55, 17, 11, 8, 9; 455/3.1, 5.1, 6.3, 6.6, 4.1, 4.2, 6.2; 340/825.081, 825.22; 379/92–96, 100, 202; 358/468, 402, 440, 310; 382/179, 317; 380/10

[56] References Cited

U.S. PATENT DOCUMENTS 3,668,307   6/1972   Face et al. ................................ 348/12
4,633,462   12/1986  Stifle et al. ............................. 370/85.1
5,408,680   4/1995   Hattey et al. ............................ 370/327
5,421,030   5/1995   Baran ........................................ 379/96
5,446,490   8/1995   Blahut et al. ............................. 348/12
5,455,823   10/1995  Noreen et al. ............................ 370/73
5,506,837   4/1996   Sollner et al. .......................... 370/296

FOREIGN PATENT DOCUMENTS

WO9306669   4/1993   WIPO .

OTHER PUBLICATIONS

"Videokompressionsverfahren Verlust Ohne Frust", Funkschau Nov. 1994, pp. 55–59.

Primary Examiner—Dang Ton
Attorney, Agent, or Firm—Edward W. Goodman

[57] ABSTRACT

A CATV system (1) operating as a two-way multiple access communication system in which a plurality of user stations (US1 to US5) communicate with a central station (CS) which can provide video programs. The system (1) can be an interactive TV system in which the user stations (US1 to US5) can order a specific program, or can respond to multiple choice questions in a program, or the like. For exchanging session accompanying information between the central station (CS) and the user stations (US1 to US5) a common control channel is provided. For true interactivity in high capacity and high user density systems, session accompanying control information is exchanged between the central station (CS) and the user stations (US1 to US5) via dedicated control channels (DSCS, USCS). Such a system (1) satisfies the needs of all kinds of multi-media systems, interactivity being an important feature in such systems.

16 Claims, 4 Drawing Sheets

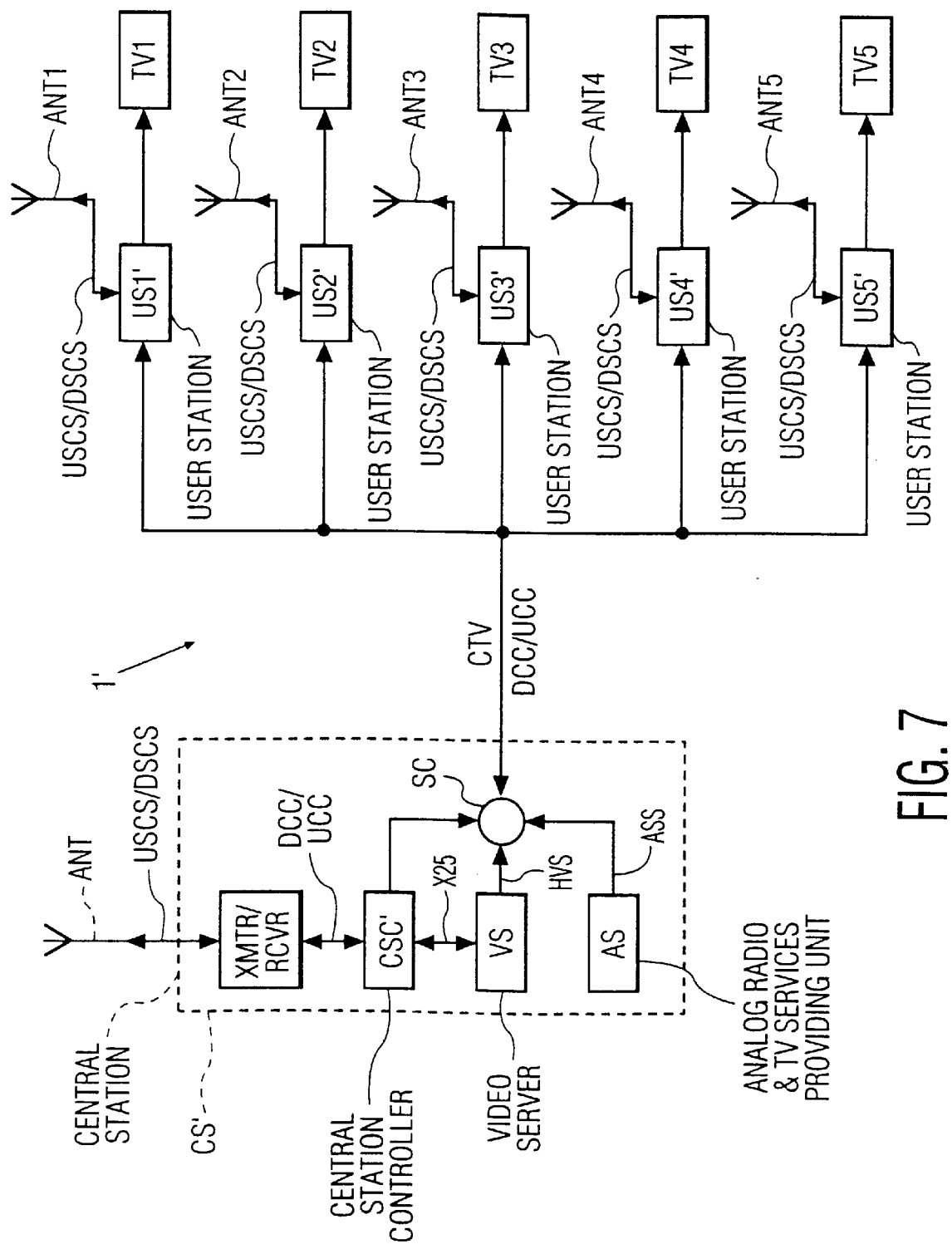

TWO-WAY MULTIPLE ACCESS COMMUNICATION SYSTEM, AND A CENTRAL STATION AND A USER STATION FOR USE IN SUCH A SYSTEM

This is a continuation of application Ser. No. 08/485,893, filed Jun. 7, 1995 now abandoned.

BACKGROUND OF THE INVENTION

1. Field of the Invention

The present invention relates to a two-way multiple access communication system comprising at least one central station, a plurality of user stations, and a transmission network for exchanging at least video information comprising user information in sessions between the central station and the user stations, and for exchanging session accompanying control information. Such a network can be a CATV-network, a radio network, or the like.

The present invention further relates to a central station and a user station for use in such a system.

2. Description of the Related art

A two-way multiple access communication system of this kind is known from the European Patent Application No. 0 140 475, corresponding to U.S. Pat. No. 4,633,462. An interactive multiple access communication system is described in which, in a downstream direction of a CATV (Community or Cable Television) network, as a transmission network, a plurality of television programs are supplied by a CATV head end, as a central station, to a plurality of user stations, the transmission network being a coaxial cable. For offering interactive television services such as video-on-demand, response to multiple choice queries, or the like, in U.S. Pat. No. 4,633,462 common forward and reverse channels are provided which are common to all user stations, and which are separate from television channels for providing the television programs, the reverse channel occupying a frequency band below 30 MHz, and the forward channel occupying a TV channel equivalent frequency band above 50 MHz. Interactivity characterizes a system in that a maximum response time from the central station to a subscriber station input is less than a predetermined response time, e.g., less than one second. Via the forward and the reverse channels, session accompanying control information is exchanged between the central station and the user station in traffic packets containing user station addresses inter alia. For solving a packet collision problem on a common control channel, typical for CATV systems having many branches and sub-branches, in U.S. Pat. No. 4,633,462 a retransmission mechanism is disclosed in which the central station acknowledges control messages from the user station. Although the known system operates satisfactorily to some extent in providing interactive television inter alia, capacity problems arise when many user stations having a lot of reverse traffic will have to communicate with the central station simultaneously. Then, either the system becomes blocked, or a true interactive service can no longer be provided. Furthermore, when applying a common control channel, the channel has to be a relatively wide-band channel with relatively high speed transmission. This would disadvantageously lead to the user station needing a relatively high-speed modem for communicating control messages, such a modem being relatively expensive.

SUMMARY OF THE INVENTION

It is an object of the present invention to provide a two-way multiple access communication system of the above kind having a high capacity and having true interactive capability, inter alia.

To this end, the two-way multiple access communication system according to the present invention is characterized in that, at least in an upstream direction of the transmission network, the session accompanying control information is exchanged via a dedicated control channel. The present invention is based upon the insight that usually, when the system has to provide true interactivity to many user stations simultaneously in the upstream direction, a relatively high traffic capacity is needed. By providing a dedicated control channel per session, such a need can be fulfilled.

In an embodiment of a two-way multiple access communication system according to the present invention, also in a downstream direction of the transmission network, the session accompanying control information is exchanged via a dedicated control channel. Although there is usually less traffic in the downstream direction from the central station to the user stations so that a common forward channel could be provided, for quick and secure responses to requests from the user stations, the central station advantageously also can provide control data via the dedicated channels. In this way, the system is suitable for all kinds of multi-media applications, such as pay-per-view, video-on-demand, teleshopping, interactive television, games, TV education, teleworking, or the like, or other applications such as monitoring of customers' choices of selected television programs, or the like.

In an embodiment of a two-way multiple access communication system according to the present invention, the transmission network comprises a cable television network for exchanging the user information, and a two-way multiple access radio system for exchanging the session information, the central station being coupled to the cable television network and to the radio system. Although the system can be a dedicated system on a CATV network, i.e., all signals to and from the user stations are routed via the CATV network, also an ordinary CATV network, or the like, can be transformed into a two-way multiple access communication system according to the present invention by combining such an ordinary CATV network with an existing two-way multiple access radio system such as a GSM (Global System for Mobile Communications) or a DECT (Digital European Cordless Telecommunications) system, or the like, the radio system supplying full duplex traffic channels as the dedicated control channels for each session. A proper choice whether to select a dedicated system or a combined system could depend on cost considerations per session. In the case of GSM, a mobile-to-base station band, e.g. 890–915 MHz, is applied for the upstream control channels, and a base-station-to-mobile band, e.g. 935–960 MHz is used for the downstream control channels. The GSM system can be used as a separate radio system coupled to the CATV system, or the functionality of the GSM system can be integrated in the CATV system, terrestrial cells being replaced by the CATV network. When using the functionality of the GSM system within the CATV network, all 124 channels of 200 kHz can be used, so that 124×8=996 user stations can be served simultaneously, per user station in each direction, a control channel for a bit rate of 9.6 kbit/s being available. For CATV networks specified for lower frequencies, the GSM frequency bands can simply be adjusted thereto. E.g., for the upstream channels, the 5–30 MHz band can be used, and the downstream channels can be allocated in between VHF bands II and III.

In an embodiment of a two-way multiple access communication system according to the present invention, the dedicated control channels are multiplexed by means of time division multiplexing, or by means of frequency division multiplexing, or by means of a combination of time division multiplexing and frequency division multiplexing. Herewith, a well-manageable control structure is achieved for offering the desired control channel capacity.

Further embodiments relate to further structural and/or functional features of the system such as the transmission network being a cable television network, the central station comprising managing arrangements for assigning the dedicated control channels when receiving a session request message from a user station and for assigning transmission channels to session data streams, the presence of a common upstream control channel for session requests from user stations, and a storage means in the central station for storing dedicated channel numbers as assigned to sessions.

BRIEF DESCRIPTION OF THE DRAWINGS

The present invention will now be described, by way of example, with reference to the accompanying drawings, wherein:

FIG. 7 shows an alternate embodiment of the two-way multiple access system shown in FIG. 1.

Throughout the figures the same reference numerals are used for the same features.

DESCRIPTION OF THE PREFERRED EMBODIMENT

Figure 1:
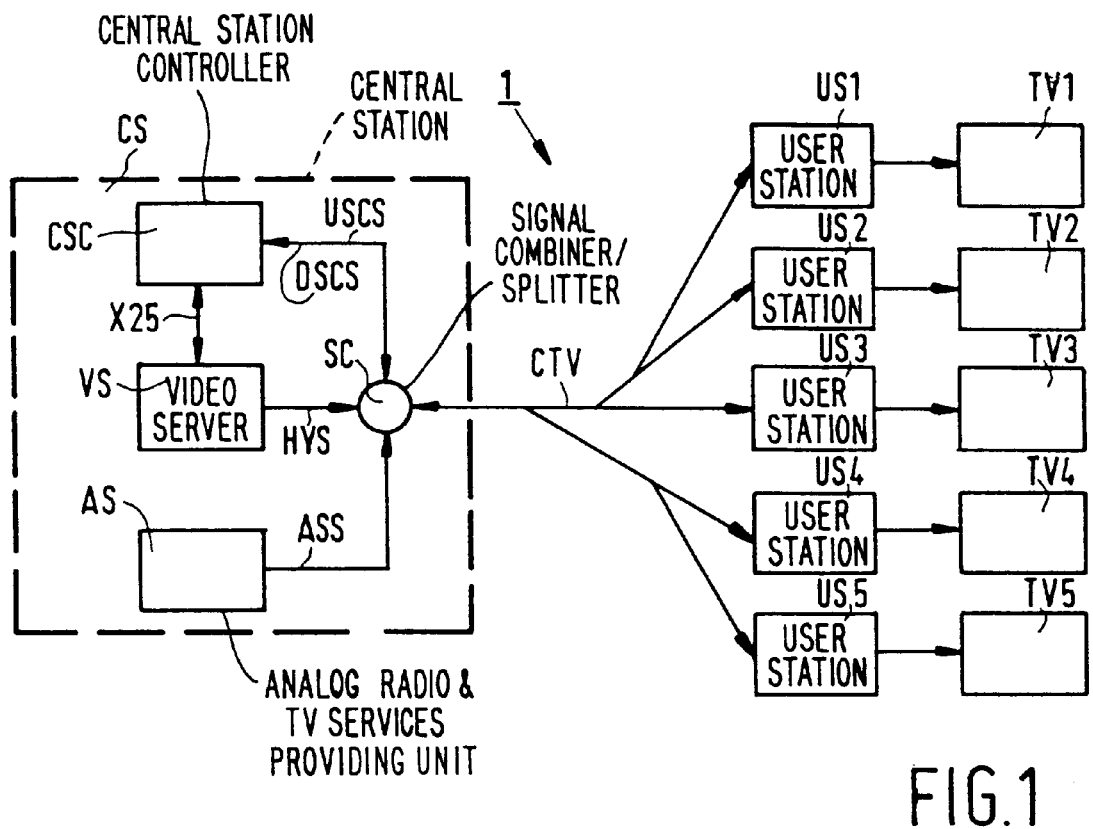
FIG. 1 schematically shows an interactive television system on a CATV network as a two-way multiple access system according to the present invention.

FIG. 1 schematically shows an interactive television system on a CATV network as a two-way multiple access system 1, according to the present invention, comprising a central station CS coupled to a plurality of user stations US1 via a CATV network CTV. In the example given, all information, user information and control information is exchanged between the user stations US1 to US5 and the central station CS via the network CTV as a transmission network, i.e., no separate transmission network, like a telephone network, is used. The user stations US1 to US5, or Set-Top Boxes, are coupled to television sets TV1 to TV5, the user stations including means for responding (not shown) to the central station CS. Such responding means could be included into remote control units (not shown) of the user stations US1 to US5. The central station, or cable head end, CS comprises a video server VS for providing hyper band downstream signals HYS, a central station controller CSC for generating downstream control signals DSCS to the user stations US1 to US5, and processing upstream control signals USCS from the user station US1 to US5, an analog radio and TV services providing unit AS for providing VHF band I, II and III signals and UHF band IV and V signals ASS, and a signal combiner/splitter SC for combining the downstream signals ASS, HYS, and DSCS, and splitting the upstream control signals USCS to the controller CSC. The video server VS can be a so-called multi-media server. According to the present invention, the system 1 is a two-way multiple access system to which n user stations can have access, m user stations being active simultaneously, m<n, m and n being integers. For a typical network and application, n can be in the order of thousands, and m can be in the order of hundreds. The hyper band signals can be compressed digital signals, using signal compression according to the MPEG-1 or MPEG-2 standard, or the like. For a more detailed description of video compression techniques such as MPEG (Moving Picture Expert Group), referred is to "Videokompressionsverfahren, Verlust Ohne Frust", Funkschau No. 11, 1994, pp. 54–59. The digitally compressed signals can represent still pictures or moving pictures. The upstream control signals can represent interactive TV control signals from the user stations US1 to US5, can represent requests from the user stations for an interactive TV session, for a video film (so-called Video-on-Demand), or many other services in the field of Multi-Media applications. The downstream control signals DSCS can represent messages from the central station CS to the user stations US1 to US5 indicating channels of bought movies (Video-on-Demand), can represent handshake control signals or other data for interactive TV applications, or many other control signals in the field of Multi-Media applications. According to the present invention, in at least the upstream direction, the session accompanying upstream control information USCS is exchanged via a dedicated control channel, e.g., on a TDM (Time Division Multiplexing) basis, on an FDM (Frequency Division Multiplexing) basis, or on the basis of a combination thereof, or on the basis of another multiplexing technique. In the example given, also the session accompanying downstream control information is exchanged via a dedicated control channel. Typically, the dedicated control channels can transfer control information at a bit rate of 9.6 kbit/s. For session requests, a common control channel can be used, as will be described in the sequel.

Figure 2:
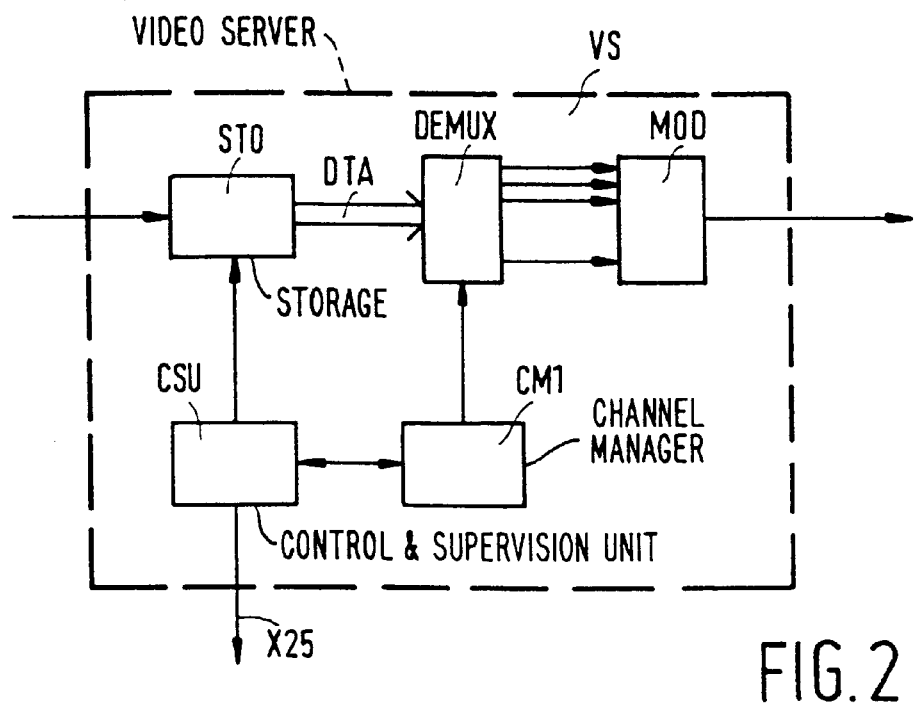
FIG. 2 shows a video server in such a system.

FIG. 2 shows the video server VS in the system 1. As an example, an interactive TV session on the CATV network CTV will be described, the system, according to the present invention, also being usable for other Multi-Media applications. An interactive TV session could be shopping TV. Suppose, a customer wants to buy a new car. In the interactive TV session, the TV-screen of the television set TV1 shows a picture of a shopping center. With a joy-stick (not shown) on his remote control unit, the customer can point to the part of the shopping centers where car dealers are located. An outline of this part of the shopping center is then shown on the TV-screen. With the remote control unit, the customer selects a particular car dealer, and then a particular car type for sale by the selected dealer. When selecting the particular car type, a video presentation as to this car type is shown on the TV-screen. In an again interactive way, the customer can request additional information, and can make his buying decision via the remote control. The video presentations are available from the video server VS. For implementing the described interactive TV session, the video server VS comprises a storage STO, e.g., a disk array having a storage capacity of 100 Giga bytes, for storing digitally compressed movies, and digital modulators MOD, e.g., using 64-QAM modulation, for modulating data streams DTA of ordered movies. The storage should have a fast enough access time to service up to m user stations simultaneously, e.g. m=200. When using MPEG-1 coding at a bit rate of 1.544 Mbit/s, a total of 150 hours of moving pictures can be stored onto the storage STO, this being equivalent to some 100 movies. For interactive TV, graphics, text, and data are stored, besides video and audio. The video server VS further comprises a control & supervision unit CSU which is coupled to the storage STO and to a channel manager CM1, and still further comprises a demultiplexing arrangement DEMUX for demultiplexing the video data stream DTA to a number of parallel data streams each containing a number of user streams. E.g., the demultiplexing arrangement provides 10 parallel MPEG-2 transport streams, each containing 20 user streams of 1.544 Mbit/s each, for m=200. The modulator MOD then comprises 10 parallel operating 64-QAM cable modulators (not shown in detail). The data stream DTA for all m user stations is a packetized stream with a user station identification in each packet so as to determine the destination of the packet. At an output of the modulator complex MOD, 10 channels of 8 MHz are provided, each channel using the so-called hyper band 300–450 MHz, or, alternatively, the lower part of the UHF V band 550–750 MHz, each channel having a capacity of over 30 Mbit/s. In this way, the m=200 data streams are directed into appropriate transmission channels, the channel manager CM1 assigning channels to streams, and taking care that the capacity of separate channels is not exceeded. The channel manager CM1 further communicates the channel assignments to the unit CSU, which, on its turn, communicates the channel assignments to the user stations. For this purpose, an link X25 is provided, coupling the video server VS to the central station controller CSC. For communication between the video server VS and the central station controller CSC, a well-known packet transfer protocol X.25 is applied, making the video server VS independent from the control channel transmission network.

Figure 3:
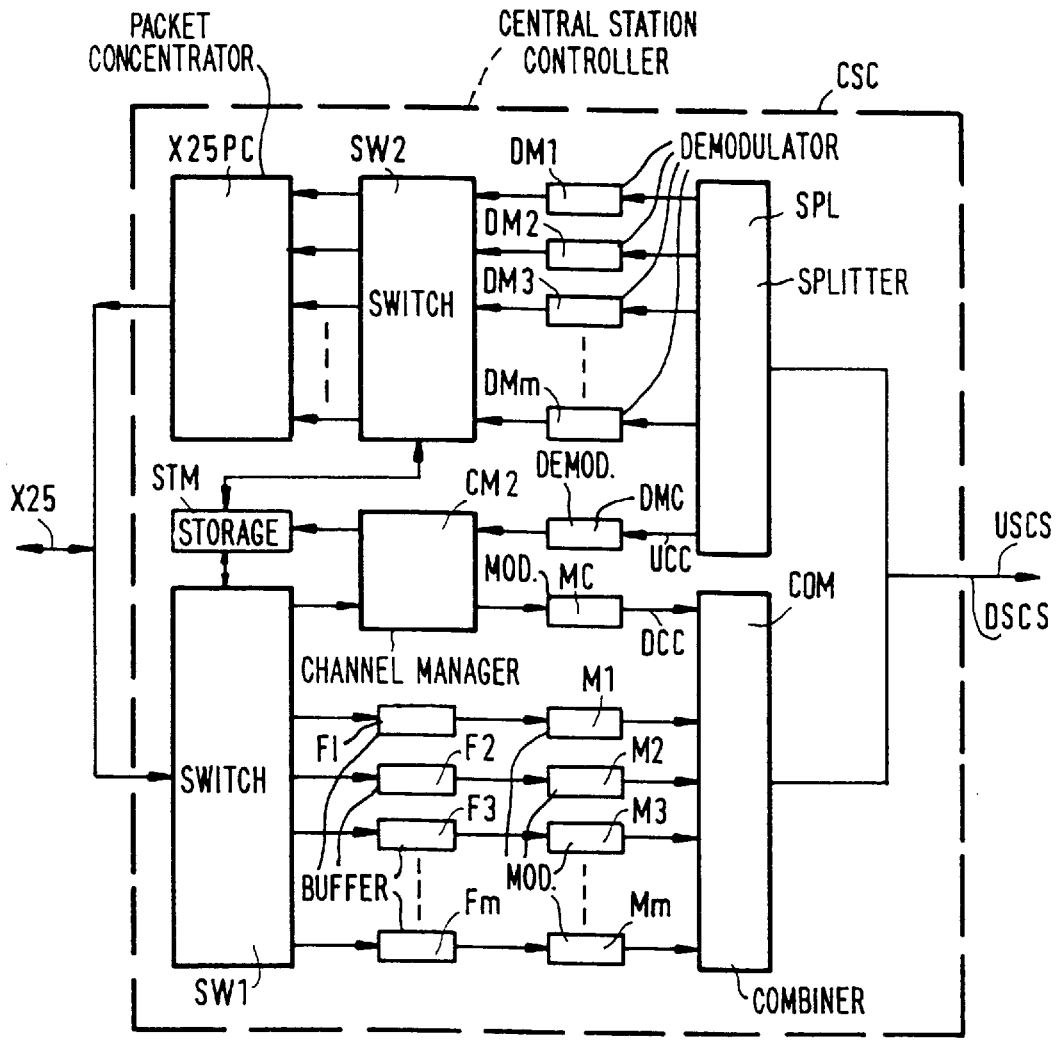
FIG. 3 shows a head-end control modem in such a system.

FIG. 3 shows a head-end control modem as the central station controller CSC in the system 1, comprising a switch SW1 which is coupled to m, e.g., m=200, downstream dedicated control channels comprising respective FIFO-buffers (First-In-First-Out) and modulators F1, M1, F2, M2, F3, M3 . . . , Fm, Mm, the modulators M1 to Mm being coupled to a combiner COM of which an output provides RF (Radio Frequency) signals representing the dedicated downstream control channels DSCS. The downstream control channels occupy a frequency band of 25 MHz, e.g. 149–174 MHz. The central station controller CSC further comprises a splitter SPL, an input of which being coupled to the network CTV so as to process the dedicated upstream control channels USCS, occupying a frequency band of 25 MHz, e.g., 5–30 MHz. The splitter SPL is coupled to m, e.g., m=200, demodulators DM1, DM2, DM3, . . . , DMm of which outputs are coupled to a switch SW2. The switch SW2 is coupled to packet concentrator X25PC, operating in accordance to the well-known X.25 packet concentrating mechanism. The central station controller CSC further comprises a channel managing arrangement CM2 which is coupled to the switch SW1, the channel managing arrangement CM2 being coupled to storage means STM for storing channel numbers of dedicated control channels, which are assigned by the channel managing arrangement CM2 to sessions requested by the user stations. The channel managing arrangement CM2 is further coupled to a modulator MC and a demodulator DMC so as to provide a common downstream control channel DCC, and a common upstream control channel UCC, respectively. The central control station controller CSC is arranged for modulating and demodulating m, e.g. m=200, dedicated control signals of 9.6 kbit/s upstream, and 9.6 kbit/s downstream, respectively. In the RF band, signal multiplexing of the 200 dedicated control channels can be done by using time division multiplexing, by using frequency division multiplexing, by using a combination of time division multiplexing and frequency division multiplexing, or by any other well-known signal multiplexing technique. The dedicated control channels are session accompanying control channels. For other purposes, such as transferring of session start-up messages from the user stations, or transferring of other general messages, the common control channels DCC and UCC are available. When a user station US1 to US5 has a session request for opening an interactive TV session, it transmits a session request message to the central station CS via the common upstream control channel UCC which is monitored by the channel managing arrangement CM2. Since all of the n, e.g. n=1000, user stations, which may have access to the network CTV, use the upstream common control channel UCC for transmitting their session request messages, collisions may occur. In case the channel managing unit CM2 in the central station controller CSC notices a collision, it transmits a message on the downstream common control channel DCC to the involved user stations to inform them to retransmit their request message after a randomly selected waiting time. If a session request message if properly detected by the channel managing arrangement CM2, it assigns an available dedicated upstream control channel and an available dedicated downstream control channel to the requesting user station, the storage means STM being updated so as to keep track of the assigned dedicated channels. The central station controller CSC transmits an acknowledgement/assignment message to the requesting user station via the downstream common control channel DCC, the message comprising the assigned dedicated channel numbers and an identification number of the requesting user station. When receiving the acknowledgement/assignment message, the requesting user station tunes to the assigned dedicated control channels. The switch SW2 selectively passes data received from assigned dedicated upstream control channels to the X.25 packet concentrator X25PC. When the switch SWI receives packets from the control & supervision unit CSU, it reads a destination identifier stored in a packet header, consults the storage means STM for acquiring the corresponding assigned dedicated upstream channel number, and passes the packet to the corresponding channel FIFO-buffer. When closing a session, the user station informs the control & supervision unit CSU in a message it is doing so. Thereupon, the video server VS transmits a message to the channel managing arrangement CM2 via the link X25, the channel managing arrangement CM2 updating the storage means STM so as to release the dedicated channels which were assigned to the session. Alternatively, a session may be closed when the user station switches off its power. In this case, the central station has to monitor whether or not open sessions exist. For such monitoring purposes, the user stations can transmit pilot messages at regular time intervals, when being active.

Figure 4:
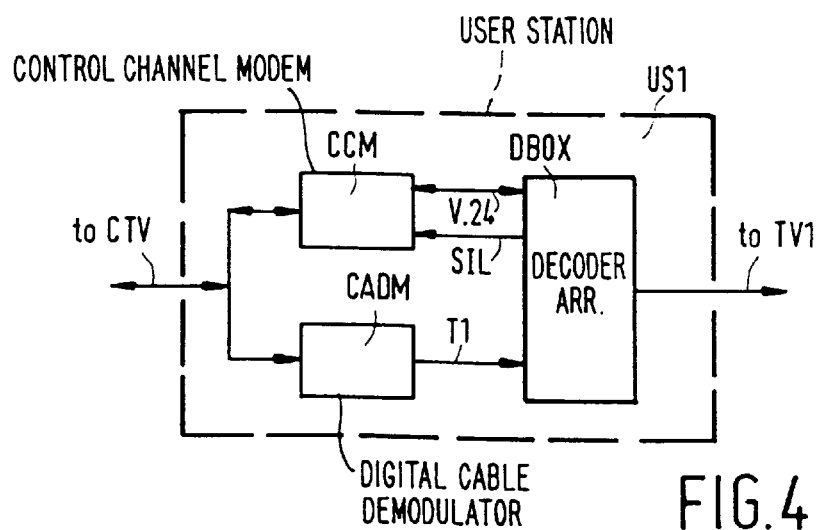
FIG. 4 shows a user station in such a system.

FIG. 4 shows the user station US1 in the system 1 which comprises a control channel modem CCM coupled to a decoder arrangement DBOX, and a digital cable demodulator arrangement CADM, the digital cable demodulator CADM being known per se. The demodulator CADM is coupled to the decoder arrangement DBOX via a so-called T1-interface, and the channel modem CCM is coupled to the decoder arrangement DBOX via a V.24 interface, also known as RS-232. A session indicator line SIL (1 bit) indicates whether or not a session is going on.

Figure 5:
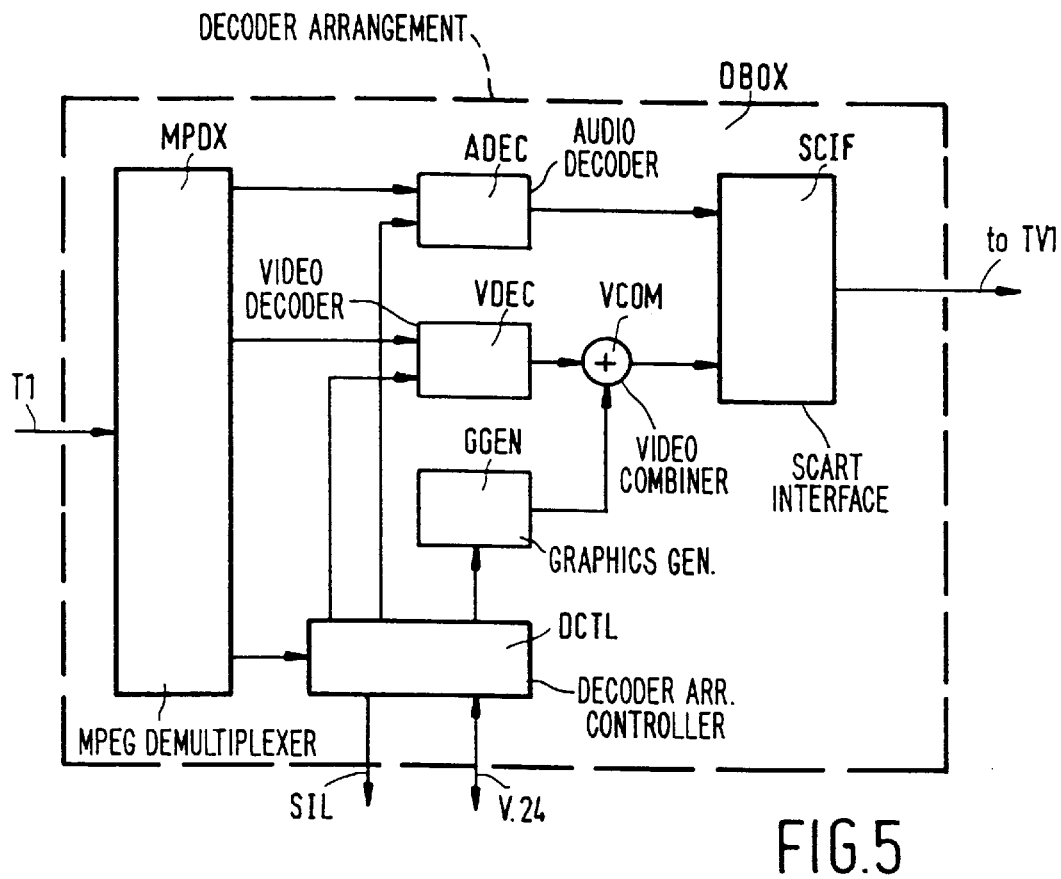
FIG. 5 shows a decoder arrangement in the user station according to the present invention.

FIG. 5 shows the decoder arrangement DBOX in the user station US1 according to the present invention. The decoder arrangement DBOX, which operates independent of the transmission network due to the fact that all transmission network dependent equipment is put outside the decoder arrangement DBOX, comprises an MPEG demultiplexer MPDX which is coupled to the demodulator CADM via the T1-interface. The MPEG demultiplexer MPDX submits demultiplexed audio information to an audio decoder ADEC, and submits demultiplexed video information to a video decoder VDEC. The decoder arrangement DBOX further comprises a graphics generator GGEN for locally generating graphical information, and a video combiner VCOM for combining the decoded MPEG video information, and the locally generated graphics. A so-called Scart interface SCIF is provided in the decoder arrangement DBOX for providing audio and video signals to the television set TV1. Furthermore, a decoder arrangement controller DCTL is provided in the decoder arrangement DBOX which is coupled to the audio decoder ADEC, to the video decoder VDEC, to the graphics generator GGEN, and to the MPEG demultiplexer MPDX. The controller DCTL renders the session indicator line SIL high or low, when a session is required or when a session is to be closed, respectively. Information to be exchanged between the central station CS and the user station US1 is transferred between the decoder arrangement DBOX and the control channel modem CCM via the V.24 interface.

Figure 6:
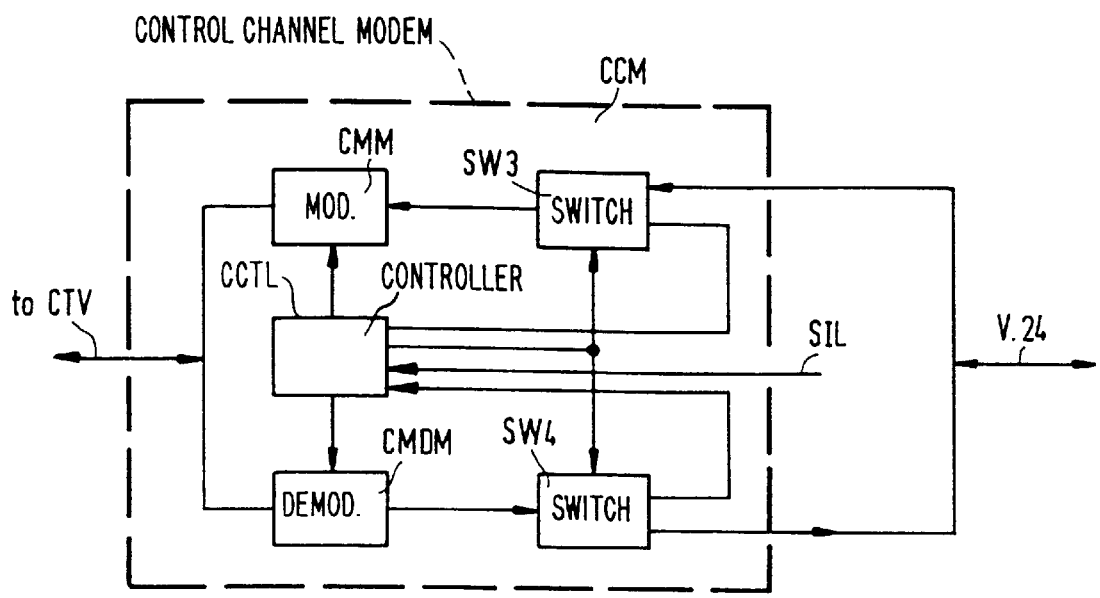
FIG. 6 shows a control channel modem in such a user station.

FIG. 6 shows the control channel modem CCM in the user station US1 comprising a modulator CMM and a demodulator CMDM coupled to respective switches SW3 and SW4, and to the network CTV. The control channel modem further comprises a controller CCTL which is coupled to the modulator CMM, to the demodulator CMDM, to the switch SW3, to the switch SW4, and to the session indicator line SIL. When a user desires to set-up a session with the central station CS via the decoder arrangement DBOX, the decoder arrangement renders the session indicator line SIL high, the controller CCTL monitoring the line SIL. At a logical high of the line SIL, the controller CCTL actuates the switches SW3 and SW4 such that the controller CCTL can communicate with the central station CS via the modulator CMM, and via the demodulator CMDM. First, the controller CCTL tunes the modulator CCM and the demodulator CMDM to the common control channels UCC and DCC, respectively. The controller transmits a session request message to the central station CS via the upstream common control channel UCC for opening an interactive TV session. If the session request message is acknowledged by the central station CS via the downstream common control channel DCC, such an acknowledgement is accompanied by assigned dedicated control channel numbers, both upstream and downstream. Thereupon, the controller CCTL tunes the modulator CMM and the demodulator CMDM to the assigned upstream and downstream dedicated control channel, respectively, and actuates the switches SW3 and SW4 such that the decoder arrangement DBOX is coupled to the demodulator CMM and to the demodulator CMDM for exchanging session accompanying messages with the central station CS. If the session is to be closed, the decoder arrangement DBOX transmits a message to this end to the central station CS, and renders the line SIL low.

FIG. 7 shows an alternate embodiment of the two-way multiple access system 1' similar to that described earlier with reference to FIG. 1. In this embodiment, while the user stations US1'-US5' communicate session requests via the common upstream control channel (UCC) and the central station CS' communicates, for example, session request message acknowledgements via the common downstream control channel (DCC), a two-way multiple access radio system provides the dedicated channels for the exchange of session accompanying control information. In particular, the central station CSC' sends and receives such information to/from a transmitter/receiver which is connected to an antenna ANT. Correspondingly, the user stations US1'-US5' are connected to respective antennas ANT1-ANT5. The central station CSC' then sends via the DCC the designation of the channel assigned for this session in the two-way multiple access radio system to the requesting user station, and further session accompanying control information is exchanged over this channel.

I claim:

1. A two-way multiple access communication system comprising at least one central station, a plurality of user stations, and a transmission network for exchanging at least video information comprising user information in communication sessions between the central station and the user stations, and for exchanging session accompanying control information, characterized in that, at least in an upstream direction of the transmission network from the user stations to the central station, said two-way multiple access communication system comprises:

at least one control channel for conveying said session accompanying control information;

means for assigning said control channel to a particular user station during one communication session for conveying session accompanying control information relating to said particular user station during said one communication session, whereby said control channel is dedicated to said particular user station during said one communication session; and means for assigning said control channel to another user station during another communication session for conveying session accompanying control information relating to said another user station after said one communication session has ended, whereby said control channel is then dedicated to said another user station during said another communication session.

2. A two-way multiple access communication system according to claim 1, wherein, also in a downstream direction of the transmission network, said two-way multiple access communication system further comprises:

at least one further control channel for conveying session accompanying control information;

means for assigning said further control channel to a further particular user station during one further communication session for conveying session accompanying control information relating to said further particular user station during said one further communication session, whereby said further control channel is dedicated to said further particular user station during said one further communication session; and means for assigning said further control channel to another further user station during another further communication session for conveying session accompanying control information relating to said another further user station after said one further communication session has ended, whereby said further control channel is then dedicated to said another further user station during said another further communication session.

3. A two-way multiple access communication system according to claims 1 or 2, wherein the transmission network is a cable television network.

4. A two-way multiple access communication system according to claims 1 or 2, wherein the transmission network comprises a cable television network for exchanging the user information, and a two-way multiple access radio system for exchanging the session accompanying control information, the central station being coupled to the cable television network and to the radio system.

5. A two-way multiple access communication system according to claims 1 or 2, wherein the central station comprises a first channel managing arrangement for assigning a dedicated upstream control channel and/or dedicated downstream control channel to a user station, when said central station receives a session request message from the user station.

6. A two-way multiple access communication system according to claim 5, wherein said system comprises a common upstream control channel for carrying the session request message to the central station.

7. A two-way multiple access communication system according to claim 6, wherein the central station comprises storage means for storing an identification of said assigned dedicated upstream control channels and/or assigned dedicated downstream control channels.

8. A two-way multiple access communication system according to claim 5, wherein the central station comprises a second channel managing arrangement, and a user information providing arrangement for providing user information in the form of a data stream, the second channel managing arrangement having means for assigning a transmission channel to the data stream and having means for causing the channel assignment to be communicated to a user station which has sent the session request message.

9. A two-way multiple access communication system according to any one of the claims 1 or 2, wherein the dedicated control channels are multiplexed by time division multiplexing, or frequency division multiplexing, or a combination of the time division multiplexing and the frequency division multi-plexing.

10. A two-way multiple access communication system according to any one of the claims 1 or 2, wherein the user information is a mix of video and/or audio and/or data information.

11. A two-way multiple access communication system according to any one of the claims 1 or 2, which is a multi-media system.

12. A central station for use in a two-way multiple access communication system, in which at least video information comprising user information is exchanged in communication sessions between the central station and a plurality of user stations which are coupled to the central station via a transmission network, said transmission network comprising at least one control channel for conveying session accompanying control information, characterized in that the central station comprises:

at least one control channel for conveying session accompanying control information;

means for assigning said control channel to a particular user station during one communication session for conveying session accompanying control information relating to said particular user station during said one communication session, whereby said control channel is dedicated to said particular user station during said one communication session;

means for receiving said session accompanying control information via said control channel in an upstream direction of the transmission network; and means for assigning said control channel to another user station during another communication session for conveying session accompanying control information relating to said another user station after said one communication session has ended, whereby said control channel is then dedicated to said another user station during said another communication session.

13. A central station according to claim 12, said central station further comprising means for transmitting session accompanying control information via a dedicated control channel in a downstream direction of the transmission network to a particular user station.

14. A central station according to claims 12 or 13, said central station comprising a first channel managing arrangement for assigning said control channel to said particular user station during said one communication session, storage means for storing an identification of the assigned control channels, and a second channel managing arrangement for assigning a transmission channel for session data streams upon receipt by said central station of a session request message from a user station.

15. A user station for use in a two-way multiple access communication system, in which at least video information comprising user information is exchanged in sessions between a central station and a plurality of user stations which are coupled to the central station via a transmission network, characterized in that the user station comprises:

means for transmitting a session request message to the central station;

means for receiving communication session assignment data from said central station, said communication session assignment data including an identification of, out of a plurality of control channels, a control channel dedicated to said user station, said control channel for conveying session accompanying control information relating to said user station; and means for selecting said control channel out of said plurality of control channels based on said communication session assignment data and transmitting session accompanying control information to the central station in an upstream direction of the transmission network via said control channel.

16. A method for use in a two-way multiple access communication system comprising at least one central station, a plurality of user stations, and a transmission network for exchanging at least video information comprising user information in communication sessions between the central station and the user stations, and for exchanging session accompanying control information, characterized in that said method comprises the steps:

assigning a control channel to a particular user station during a communication session with the particular user station;

dedicating the control channel to said particular user station said communication session; and assigning said control channel to another user station during another communication session with said another user station after said communication session with said particular user station has ended.

* * * * *